H. A. BEEKHUIS.
PROCESS FOR REMOVING THE SKIN FROM DRIED FRUITS.
APPLICATION FILED JUNE 21, 1916.

1,246,223.

Patented Nov. 13, 1917.
2 SHEETS—SHEET 1.

WITNESSES:

INVENTOR
Hermanus Albert Beekhuis
BY
Francis C. Huebner,
ATTORNEY

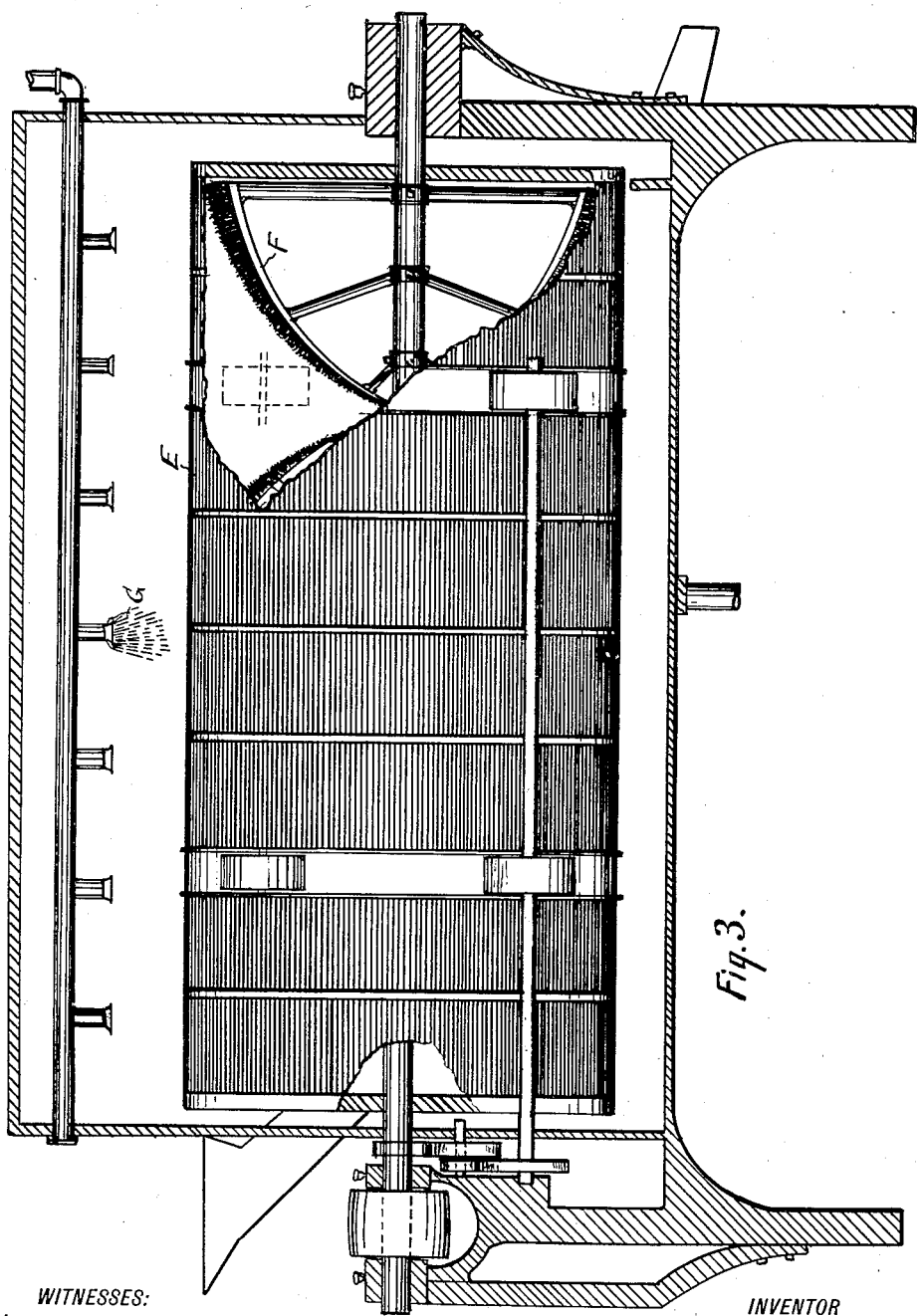

UNITED STATES PATENT OFFICE.

HERMANUS ALBERT BEEKHUIS, OF HANFORD, CALIFORNIA, ASSIGNOR TO CALIFORNIA PEACH GROWERS, OF FRESNO, CALIFORNIA, A CORPORATION OF CALIFORNIA.

PROCESS FOR REMOVING THE SKIN FROM DRIED FRUITS.

1,246,223.  Specification of Letters Patent.  Patented Nov. 13, 1917.

Application filed June 21, 1916. Serial No. 105,066.

*To all whom it may concern:*

Be it known that I, HERMANUS ALBERT BEEKHUIS, a citizen of the United States, and a resident of the city of Hanford, in the county of Kings and State of California, have invented a new and useful Process for Removing the Skins from Dried Fruits, of which the following is a specification.

My invention relates to a process for peeling and cleansing dried fruits, such as dried peaches, dried apricots and dried nectarines and similar fruits for marketable uses so it can be done cheaply and on a commercial basis. It is well known that peeling peaches and similar fruits prior to drying them is laborious and expensive and that peeling them before drying them is wasteful, for when the skin is removed and the green fruit placed in the sun, or in the heat to dry, much of the rich juices of the fruit will run from the pores of the fruit and be wasted. These juices are readily retained in concentrated form in the peach, or other similar fruit, if the fruit is cut in two parts, the stone removed, and dried with the skins on, and with the cup, or cut side of the fruit up. By this method the juices of the fruit run into, and remain in the cup, being the concavity remaining after the stone has been removed, until the moisture in such juices evaporate. My invention relates to the removal of the skins from fruits, such as hereinbefore referred to, which have been dried with the skins on, and for cleansing such dried fruits. Its object is to first soften and loosen the skin from the fruit, and then to remove such loosened skin and to cleanse the fruit, and other objects which will hereinafter appear.

Figure 1:
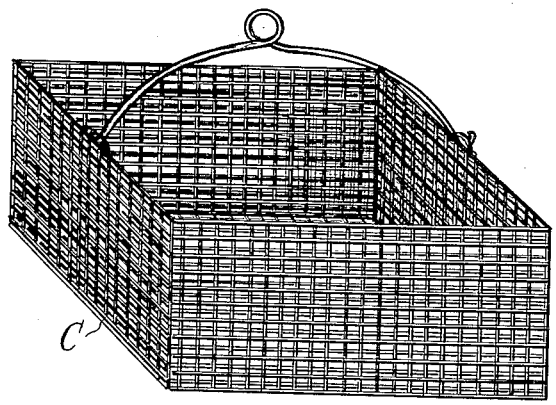
Figure 2:
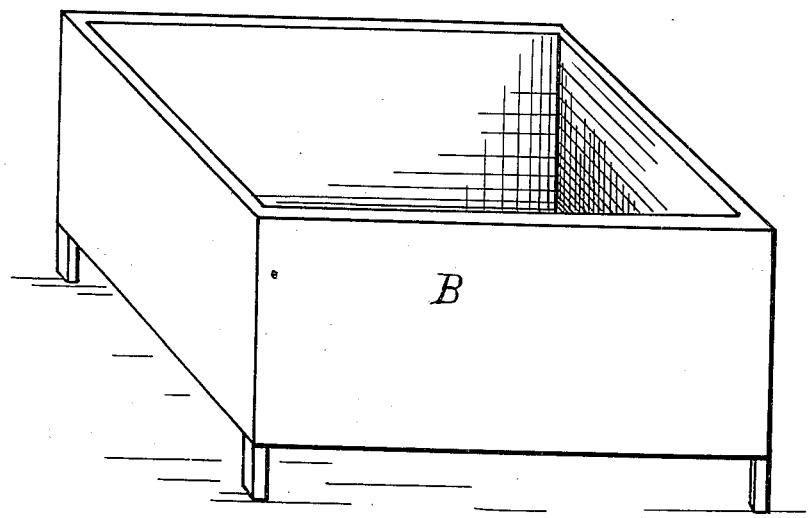

In the drawing accompanying this specification Figure 1 is a perspective view of a wire basket to be used for dipping the fruit into the bicarbonate of soda solution. Fig. 2 is a perspective view of a caldron for holding the bicarbonate of soda solution into which the fruit is dipped. Fig. 3 is a perspective side view of the device for imparting to the fruit a centrifugal motion, and for washing and brushing it.

In connection with my process I prepare a solution by dissolving approximately one part of bicarbonate of soda in fifty parts of water. This solution is heated preferably to the boiling point and the dried fruit is immersed therein for about three minutes. In my experiments I have ascertained that this solution should be made slightly stronger with bicarbonate of soda for grades of fruit which are exceptionally dry, or for old dried fruit, and it can be made weaker for moist, or freshly dried fruit. The length of time of said bath can be shortened to advantage when the fruit is of such character that the skin is readily softened and loosened, such as moist or freshly dried fruit, and the time of the bath should be lengthened if the skin is unusually tough and adheres tightly to the fruit. The proper strength of the solution and the proper length of time necessary for any certain grade of fruit to remain in the bath can be readily ascertained by observing the character of the loosening and softening of the skin after the fruit has remained in the bath for a shorter period of time than three minutes. The fruit should be permitted to remain in the bath until the skin can be rubbed off by friction. It should not be permitted to remain therein until the meat becomes soft, but it should be removed while the meat of each individual piece is still firm.

The fruit can be given the bath of hot water and bicarbonate of soda by any suitable means. In Fig. 2 of the drawing I have shown an ordinary caldron B into which the solution is placed. C is a wire basket for holding the fruit while it is dipped into the solution. By this device the fruit can be immersed and easily withdrawn and drained. After the fruit is drained of the solution which does not readily adhere to it, it is placed in a cylinder E, hereinafter more definitely described. Cylinder E is then rotated slowly, and while within said cylinder the fruit is subjected to a centrifugal motion, to a rolling motion within the cylinder, and to a brisk brushing by a rotating spiral brush F which is revolved within the cylinder very rapidly, and in an opposite direction to the rotation of the cylinder. The means for rotating the cylinder and the brush can be any of the ordinary means for turning wheels, and is not shown on the drawing. Brush F extends close to the inside cylinder wall, and the movement of the brush will briskly brush the fruit, removing the loosened skin and the dust and dirt which may be on the fruit, and at the same time it will give the fruit a centrifugal motion. The spiral form of the brush is arranged to carry the fruit from the end of the cylinder into which it is placed to the other end thereof, where the cleansed and peeled fruit is deposited into an ordinary receptacle which need not be herein described in detail. While the fruit is within the cylinder and is being brushed as hereinbefore described, it is subjected to a water bath, preferably of cold water, from a spray G which is directed over the cylinder, this spray can be operated by gravity or other pressure. The object of the cold bath is to thoroughly wash the fruit and to carry away the skin which is brushed therefrom, and the dirt and dust which may be upon the fruit, and to keep the brushes and the cylinder clean, and to assist in preventing the fruit from adhering to the sides of the cylinder. Any excess of bicarbonate of soda remaining on the fruit after being drained as hereinbefore stated, will be removed by the shower bath of cold water.

The cylinder E is preferably constructed of a plurality of wires attached to the inside of circular bands, the wires preferably being arranged parallel to the axis of the cylinder and spaced a uniform distance apart, the open spaces between the wires being large enough to permit the water, skins and dirt to pass through, and the wires being close enough together to prevent the individual pieces of fruit from passing through. As the brush rotates rapidly, the fruit is partially carried with it, giving it a centrifugal motion, and the wires forming the wall of the cylinder slightly retard the movement of the fruit, turning it over, and giving it a whirling motion so that all portions of the surface of the fruit come in contact with the brush. The centrifugal motion throws off the moisture from the fruit before it has an opportunity to penetrate it, leaving it in a firm condition.

I claim as my invention, and ask for Letters Patent upon:

1. A process for loosening the skin of dried fruit such as dried peaches preliminary to removing it consisting of immersing such dried fruit in a solution consisting of approximately one part bicarbonate of soda to fifty parts of water heated to the boiling point.

2. A process for loosening the skin of dried fruits such as dried peaches, apricots and nectarines from the meat of the fruit, preliminary to removing said skin, consisting of immersing the dried fruit in a hot solution of water containing bicarbonate of soda.

3. A process for loosening the skin of dried fruits such as dried peaches, preliminary to removing the skin therefrom, consisting of immersing the dried fruit in a solution of water containing bicarbonate of soda.

4. A process for loosening the skin of dried fruits such as dried peaches, preliminary to removing said skin consisting of immersing said fruit for a period of about three minutes in a hot solution of water and bicarbonate of soda.

5. A process for removing the skin of dried fruit, such as peaches, which has previously been loosened, consisting of subjecting the fruit to a shower bath of water and at the same time imparting a centrifugal motion to the fruit.

6. A process for removing the skin of dried fruit such as dried peaches, consisting of brushing them under a shower bath, and subjecting them to a centrifugal motion.

7. A process for removing the loosened skin from dried fruits, such as peaches, while they are being washed, consisting of brushing them thoroughly and at the same time imparting to them a centrifugal motion.

8. A process for cleansing dried fruits such as peaches, the skins of which have been loosened by subjecting them to a shower bath while undergoing a centrifugal motion.

9. A process for cleansing dried fruits such as peaches, the skins of which are loosened, consisting of subjecting them to a combined centrifugal motion, a shower bath, and a brushing.

10. A process for removing the skin of dried fruits such as dried peaches, which has previously been loosened, and while cleansing them, consisting of subjecting the fruit to a brisk brushing, and a centrifugal motion.

11. A process for removing the skin of dried fruit such as dried peaches, which has previously been loosened, and while such fruit is being washed under a spray, consisting of subjecting the fruit to a centrifugal and whirling motion.

12. A process for removing the skins of dried fruit such as peaches, which have previously been loosened, consisting of imparting a combined centrifugal motion and a rolling motion to the fruit while said fruit is being subjected to a spray of water.

13. A process for removing the skins from dried fruits, such as peaches, consisting of subjecting such dried fruits to a bath consisting of bicarbonate of soda and water, and then to a combined centrifugal motion and brushing.

14. A process for removing the skins from dried fruit, such as peaches, apricots and nectarines, by subjecting said fruit to a hot bath of bicarbonate of soda and water, the removal of the fruit from said bath, draining it, and then subjecting it to a water bath while undergoing a centrifugal and turning motion and while being brushed.

15. A process for removing the skins from dried fruits, such as peaches, by subjecting said fruits to a bath consisting of approximately fifty parts of water to one part of bicarbonate of soda until the skins thereon are loosened, and then subjecting said fruit to a thorough washing with approximately pure water, and to a centrifugal motion within a cylinder having a plurality of openings through its wall.

16. The process of curing peaches and similar fruits which consists in drying the same with their skins on wetting the fruit with bicarbonate of soda and removing the skins.

17. The process of treating peaches or similar fruits which consists in dividing and drying the fruit with its skin side down to retain the juices, then wetting the dried fruit with bicarbonate of soda and removing the skin.

18. A process for curing peaches consisting of cutting the peaches in halves, removing the seeds therefrom, drying them, and then removing the skins therefrom.

19. A process for curing peaches and similar fruits consisting of drying them, and then removing the skins therefrom.

HERMANUS ALBERT BEEKHUIS.

Witnesses:
JULIUS HANSEN,
H. A. HUEBNER.